United States Patent [19]
Roth et al.

[11] 3,939,334
[45] Feb. 17, 1976

[54] CLOSEST POINT OF APPROACH CALCULATOR
[75] Inventors: Albert Roth; Gary M. Holma, both of San Diego, Calif.
[73] Assignee: The United States of America as represented by the Secretary of the Navy, Washington, D.C.
[22] Filed: Jan. 2, 1975
[21] Appl. No.: 537,971

[52] U.S. Cl. ........ 235/156; 235/150.27; 343/112 CA
[51] Int. Cl.² ................... G06F 15/02; G06F 15/50
[58] Field of Search ............ 235/156, 150.2, 150.24, 235/150.26, 150.27; 343/12 MD, 112 CA, 112 TC

[56] References Cited
UNITED STATES PATENTS

| | | |
|---|---|---|
| 3,737,902 | 6/1973 | O'Hagan et al. .......... 343/112 CA X |
| 3,760,171 | 9/1973 | Wang et al. .......................... 235/156 |
| 3,821,523 | 6/1974 | Chisholm et al. ............... 235/150.27 |
| 3,863,060 | 1/1975 | Rode et al. .......................... 235/156 |

*Primary Examiner*—Malcolm A. Morrison
*Assistant Examiner*—Jerry Smith
*Attorney, Agent, or Firm*—R. S. Sciascia; G. J. Rubens; T. M. Phillips

[57] ABSTRACT

A manually operative, programmed (dedicated) calculator that computes the range, bearing, and time of closest point of approach for any number of selected target ships, and also their course and speed.

5 Claims, 5 Drawing Figures

| TGT E | TGT CRS | CPA | CLR DTA |
|---|---|---|---|
| TGT D | TGT SPD | OWN SPD | STP |
| TGT C | B | OWN CRS | ENT DTA |
| TGT B | T | MK 2 | RST PROG |
| TGT A | R | MK 1 | CM |

| 7 | 4 | 1 | 0 |
|---|---|---|---|
| 8 | 5 | 2 | |
| 9 | 6 | 3 | . |

FIG. 1

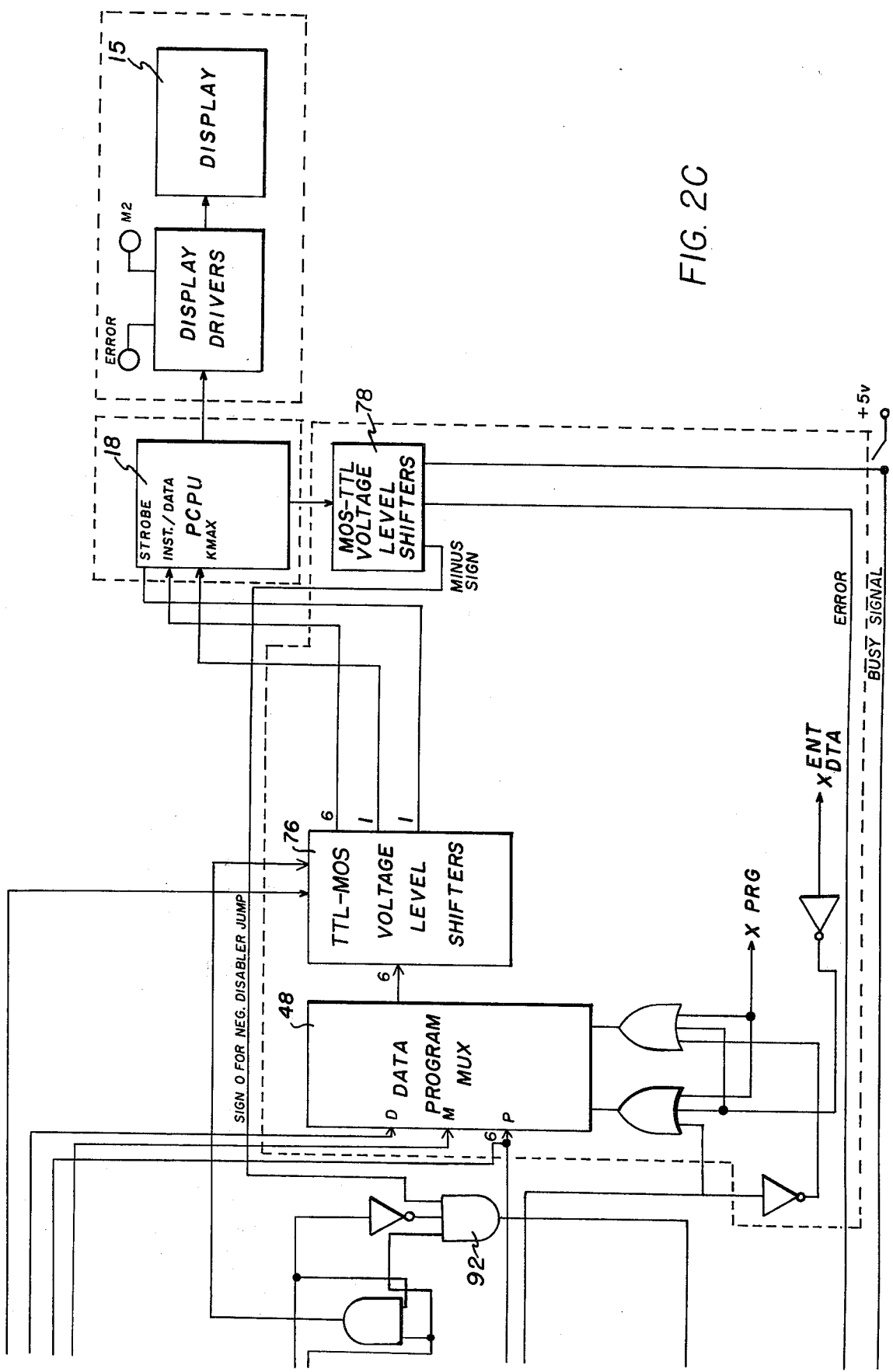

CPA ROM PROGRAM (RANGE)
256 X 8 ROM

| DECIMAL ADDRESS | INSTRUCTION | BCD ROM OUTPUT |
|---|---|---|
| 0 | C | 00010010 |
| 1 | C | 00010010 |
| 2 | $R_0-1$ | 01000100 |
| 3 | $R_0-2$ | 01000100 |
| 4 | $R_0-3$ | 01000100 |
| 5 | $R_0-4$ | 01000100 |
| 6 | $R_0-5$ | 01000100 |
| 7 | − | 00011110 |
| 8 | $R_1-1$ | 01100100 |
| 9 | $R_1-2$ | 01100100 |
| 10 | $R_1-3$ | 01100100 |
| 11 | $R_1-4$ | 01100100 |
| 12 | $R_1-5$ | 01100100 |
| 13 | = | 00011000 |
| 14 | $\sqrt{\phantom{x}}$ | 00011100 |
| 15 | C | 00010010 |
| 16 | $\theta_0-1$ | 01010000 |
| 17 | $\theta_0-2$ | 01010000 |
| 18 | $\theta_0-3$ | 01010000 |
| 19 | − | 00011110 |
| 20 | $\theta_1-1$ | 01110000 |
| 21 | $\theta_1-2$ | 01110000 |
| 22 | $\theta_1-3$ | 01110000 |
| 23 | = | 00011000 |
| 24 | X | 00011001 |
| 25 | ÷ | 00100100 |
| 26 | − | 00011101 |
| 27 | I | 00000001 |
| 28 | 8 | 00001000 |
| 29 | 0 | 00000000 |
| 30 | = | 00011000 |
| 31 | →M | 00010101 |
| 32 | COS | 00100100 |
| 33 | $\sqrt{\phantom{x}}$ | 00011100 |
| 34 | X | 00011001 |
| 35 | = | 00011000 |
| 36 | X | 00011001 |
| 37 | $R_0-1$ | 01000100 |
| 38 | $R_0-2$ | 01000100 |
| 39 | $R_0-3$ | 01000100 |
| 40 | $R_0-4$ | 01000100 |
| 41 | $R_0-5$ | 01000100 |
| 42 | X | 00011001 |
| 43 | $R_1-1$ | 01100100 |
| 44 | $R_1-2$ | 01100100 |
| 45 | $R_1-3$ | 01100100 |
| 46 | $R_1-4$ | 01100100 |
| 47 | $R_1-5$ | 01100100 |
| 48 | X2 | 00100101 |
| 49 | = | 00011000 |
| 50 | +/− | 00011011 |
| 51 | MS | 00001011 |
| 52 | →M | 00010101 |
| 53 | $R_1-1$ | 01100100 |
| 54 | $R_1-2$ | 01100100 |
| 55 | $R_1-3$ | 01100100 |
| 56 | $R_1-4$ | 01100100 |
| 57 | $R_1-5$ | 01100100 |
| 58 | X | 00011001 |
| 59 | M+ | 00010011 |
| 60 | $R_0-1$ | 01000100 |
| 61 | $R_0-2$ | 01000100 |
| 62 | $R_0-3$ | 01000100 |
| 63 | $R_0-4$ | 01000100 |
| 64 | $R_0-5$ | 01000100 |
| 65 | X | 00011001 |
| 66 | M+ | 00010011 |
| 67 | T | 00010000 |
| 68 | $\sqrt{\phantom{x}}$ | 00011100 |
| 69 | →M | 00010101 |
| 70 | MS | 00001011 |
| 71 | T | 00010000 |
| 72 | SIN | 00100001 |
| 73 | X | 00011001 |
| 74 | $R_1-1$ | 01100100 |
| 75 | $R_1-2$ | 01100100 |
| 76 | $R_1-3$ | 01100100 |
| 77 | $R_1-4$ | 01100100 |
| 78 | $R_1-5$ | 01100100 |
| 79 | = | 00011000 |
| 80 | MS | 00001011 |
| 81 | ÷ | 00011101 |
| 82 | S | 00001111 |
| 83 | = | 00011000 |
| 84 | I | 00000001 |
| 85 | MS | 00001011 |
| 86 | →M | 00010101 |
| 87 | EX | 00001101 |
| 88 | X | 00011001 |
| 89 | M− | 00010100 |
| 90 | EX | 00001101 |
| 91 | X↔M | 00010001 |
| 92 | $\sqrt{\phantom{x}}$ | 00011100 |
| 93 | X↔M | 00010001 |
| 94 | X | 00011001 |
| 95 | $R_0-1$ | 01000100 |
| 96 | $R_0-2$ | 01000100 |
| 97 | $R_0-3$ | 01000100 |
| 98 | $R_0-4$ | 01000100 |
| 99 | $R_0-5$ | 01000100 |
| 100 | = | 00011000 |
| 101 | JUMP 8 | 10000100 |
| 102 | DPO/EX | 11001101 |
| 103 | DPO/+/− | 11011011 |
| 104 | STOP | 01100001 |
| 105 |  |  |
| 106 |  |  |
| 107 |  |  |
| 108 |  |  |
| 109 | DPO/EX | 11001101 |
| 110 | STOP | 01100001 |

FIG. 3

CLOSEST POINT OF APPROACH CALCULATOR

BACKGROUND OF THE INVENTION

In prior known collision avoidance systems as for example, the system disclosed in U.S. Pat. No. 3,737,902, a highly sophisticated (and costly) collision avoidance system is married to a radar system and a large computer. This complex system is applicable only to large ships with highly sophisticated electronics equipment and requires highly skilled personnel for its operation. The present invention provides for a closest point of approach calculator that is a small, inexpensive, manually operated collision avoidance device that can be operated by unskilled personnel, and may be used aboard any ship, military or commercial, having a radar or other system of determining the location of target vessels.

SUMMARY OF THE INVENTION

The present invention provides for a small dedicated programmable mini-computer that has the capability of rapidly computing the five required closest point of approach parameters-range, time, bearing, target speed, and target course for up to five target vessels. Radar derived data from target ships-range, bearing, and time, for two sets of chronologically spaced readings, (Mark 1 and Mark 2), are manually programmed into the calculator via a keyboard as well as own ship course and speed. From this data, the calculator automatically computes any or all of the five closest point of approach selected parameters. The calculator can be broken down into three basic subgroups: data storage, programming, and a central processing unit. The data group accepts and stores target data and own ships data for later processing by the programmable calculator processing unit. The processor performs the mathematical functions necessary to solve the CPA algorithms. The programmer contains a fixed program of instructions for computing the algorithms for the determination of the required closest point of approach parameters, and means of accessing the data stored in the data group. The programmer commands the required data to be inserted into the Programmable Central Processing Unit (PCPU) and issues instructions to the PCPU to carry out the mathematical, switching, and storage functions to implement the algorithm. The final result of each set of algorithms, i.e., range, time, etc. is displayed on a digital readout display.

All operations are under the control of the operator, who can request closest point of approach data on any target by pushing appropriate keys on the keyboard.

OBJECTS OF THE INVENTION

An object of the invention is the provision of a small inexpensive manually operated collision avoidance device that can be operated by unskilled personnel and may be used aboard any ship, military or commercial, having a radar or other system of determining the location of target vessels.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a diagram of the calculator keyboard.

FIGS. 2A, 2B and 2C are a schematic diagram of the calculator.

FIG. 3 is a tabulation of the range program for ROM of FIG. 2B.

DESCRIPTION OF THE PREFERRED EMBODIMENTS

Figure 2A:
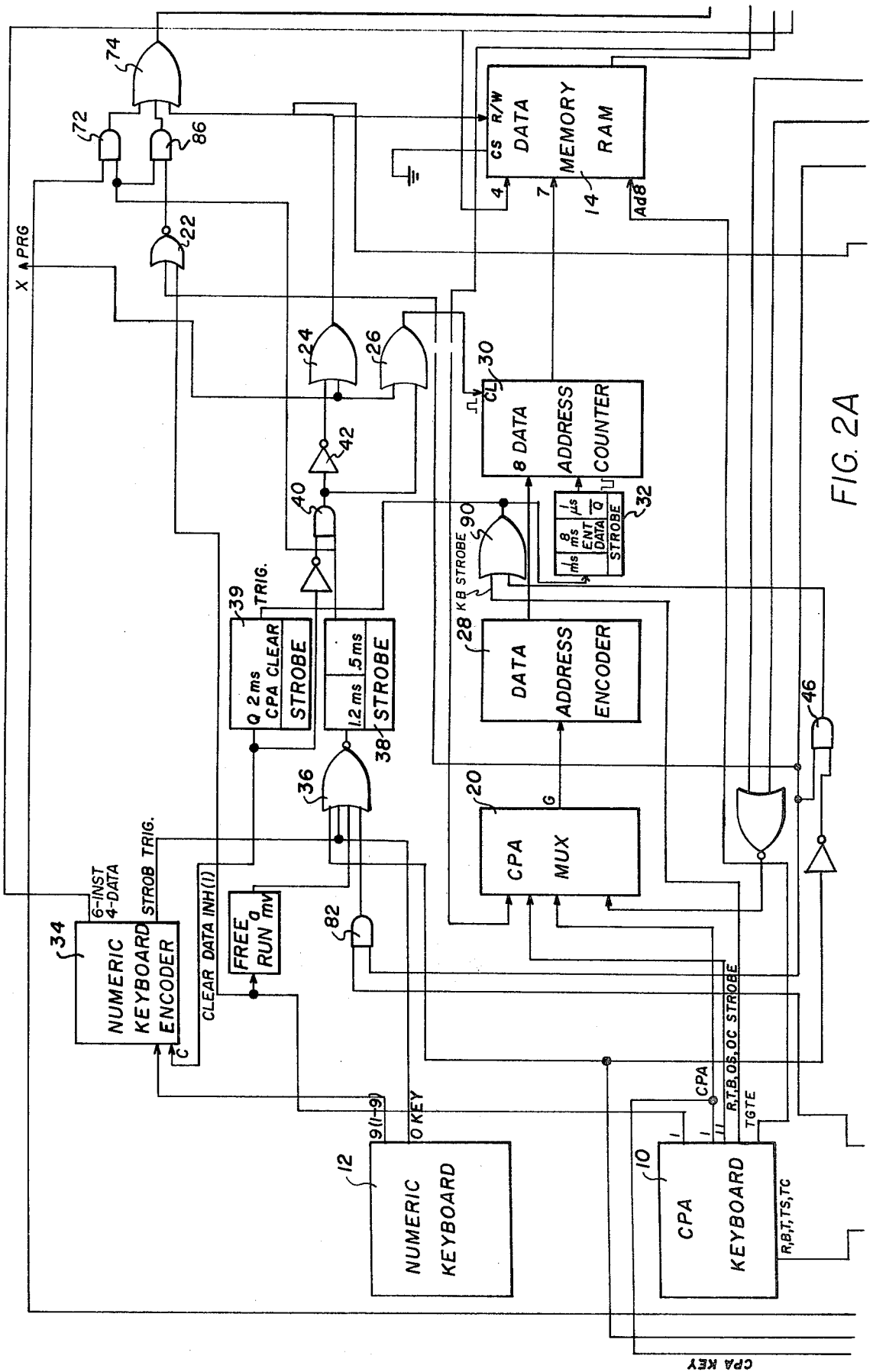

The keyboard shown in FIG. 1 has two groups of keys, the closest point of approach (CPA) keyboard 10 and the numeric keyboard 12. CPA keyboard 10 may be of the Alcoswitch SBL-6 type while numeric keyboard 12 may be of the Alcoswitch SB-033 type. The CPA keyboard 10 contains 20 keys, as shown. On the top row are the 5 target keys, labeled TGT-A through TGT-E. One of these keys is depressed when data relative to that target is being entered, or the CPA parameters for that target is calculated. The second row of keys are labeled R, T, B, TGT/SPD, TGT/CSE, pertaining to range, time bearing, target speed and target course, respectively. One of these keys is depressed when calling for computation of the subject parameters or entering the subject parameters into the calculator. Keyboard 10 should have a horizontal latch and lockout provision (not shown) such that when a key is depressed it stays depressed (latches) and releases all other keys in that row.

The third row of keys pertain to Mark 1, Mark 2, own course, own speed, and CPA. The first four keys in the third row are used when entering data, and the CPA key is depressed when calculation of the required parameter is performed.

The last row is labelled (CM), Clear Memory, (RST PRG), Reset Program, (ENT DTA), Enter Data, (STP), Stop, and (CLR DTA) Clear Data. The CM function is self explanatory, the RST PRG key is used to set the program to the first instruction of the Range algorithm, the ENT DTA key is depressed during data entry, the stop key is used to either stop the program, or prevent the program counter from incrementing, and the CLR DTA key is used to clear the Data Memory Register.

The numeric keyboard 12 is used for entering data into memory 14. Each time one of these keys is depressed, the number, or decimal point, appears on the display 15. It is cleared whenever one of the parameter keys on the CPA keyboard 10 is depressed.

In order to enter data into the data RAM 14 (FIG. 2A) the ENT DTA key is depressed, then one of the selected TGT keys followed by MK 1 or MK 2 and one of the parameter keys, e.g., range, bearing, etc. Depressing the ENT DTA key sets RAM 14 to the "write" mode and the other three keys selects the starting address for entry of data. For example, if TGT B, MK1, and RANGE keys are depressed, the data address encoder 28 (FIG. 2A) will generate the starting address of the range of target B at the first mark. This address sets data address counter 30 to the value generated by the encoder 28, which in turn sets the data RAM 14 to write in a data word (Range) in that address. Subsequently, the first digit of the range word (number) is entered via the numeric keyboard 12, and is stored in the RAM 14 at the specified address. This action causes data address counter 30 to advance by one count, thereby preparing the RAM 14 to store the following number in the next adjacent address. This process continues until all digits of the range word have been entered into succesive memory cells of the RAM 14.

Then, depressing the bearing key causes the data address encoder 28 and counter 30 to generate the starting address for the storage of bearing data. The process continues until all data for all targets, and own ships course and own ships speed have been entered. The calculator is now ready to compute and display any CPA parameter for any selected target.

Read only memory 16 should be programmed to direct PCPU 18 to solve the following closest point of approach equations:

$$\text{Range } (R_{CPA}) = \frac{R_0 R_1 \sin(\Theta_0 - \Theta_1)}{[R_0^2 + R_1^2 - 2 R_0 R_1 \cos(\Theta_0 - \Theta_1)]^{1/2}}$$

where
$R_o$ is range at first mark
$R_1$ is range at second mark
$\theta_0$ is relative bearing at first mark
$\theta_1$ is relative bearing at second mark $$\text{Time } (T_{CPA}) = \frac{R_0(T_0 - T_1)(1 - \sin^2\beta)^{1/2}}{[R_0^2 + R_1^2 - 2 R_0 R_1 \cos(\Theta_0 + \Theta_1)]^{1/2 + T_0}}$$

where
$T_o$ is time of first mark
$T_1$ is time of second mark
$\beta$ is calculated value $$\text{Bearing } (\beta_{CPA}) = \Theta_0 \pm \beta \pm \pi/2$$

$$\text{where } \beta = \frac{-2.573 \sin \beta}{\sin^2 \beta - 2.752}$$

$$\text{and } \sin \beta = \frac{R_1 \sin(\Theta_0 - \Theta_1)}{[R_0^2 + R_1^2 - 2 R_0 R_1 \cos(\Theta_0 - \Theta_1)]^{1/2}}$$

Target Velocity $(V_T) =$
$[(S)^2 + (R_2)^2 - 2 SR \cos(\Theta_0 + \delta + \beta]^{1/2}$ where $R_2 = [R_0^2 + R_1^2 - 2 R_0 R_1 \cos(\Theta_0 - \Theta_1)]^{1/2}$ $S$ = Speed of ownship
$\gamma$ = Course of own ship $$\text{Target Course } (\phi) = \sin \frac{-1 V_{TEW}}{V_T}$$

where $V_{TEW}$ is the East/West component of $V_T$

For example, in order to determine the range of CPA for target A, TGT A and R keys are depressed and the ENT DTA key is released, by pressing the RST PROG key. Depressing the R key sets the program counter 44 to the first instruction step of the range algorithm. Then depressing the CPA key causes the data RAM 14 to switch to the "read" mode, and initiates the program shown in FIG. 3. The program counter 44 (FIG. 2B) steps through a sequential number of counts, each count being the address of an instruction to the program ROM 16. The ROM 16 is programmed as described above to generate a series of control and instruction steps to carry out the computation of the range equation. Several types of instructions are required to carry out the algorithms, such as generating mathematical, switching and storage commands to the Programmable Central Processing Unit (PCPU) 18 (FIG. 2C), switching commands to the data MUX 48 (multiplexer), data access commands to the CPA MUX 20, and program jump commands to the program counter 44. PCPU 18 may be a 15171 NA manufactured by North American Microelectronics.

After the desired parameter has been computed, the result is displayed on the digital display 15, and the ROM 16 issues a STOP instruction to stop the program.

The operator then depresses another parameter key, for example, BEARING, on the CPA keyboard 10, which cuases the program encoder 42 to generate the starting address for that set of instructions for the computation of bearing. The program counter 44 is simultaneously set to this value. Then depressing the CPA key initiates the program for the computation of bearing. The other CPA parameters are similarly generated.

Figure 2B:
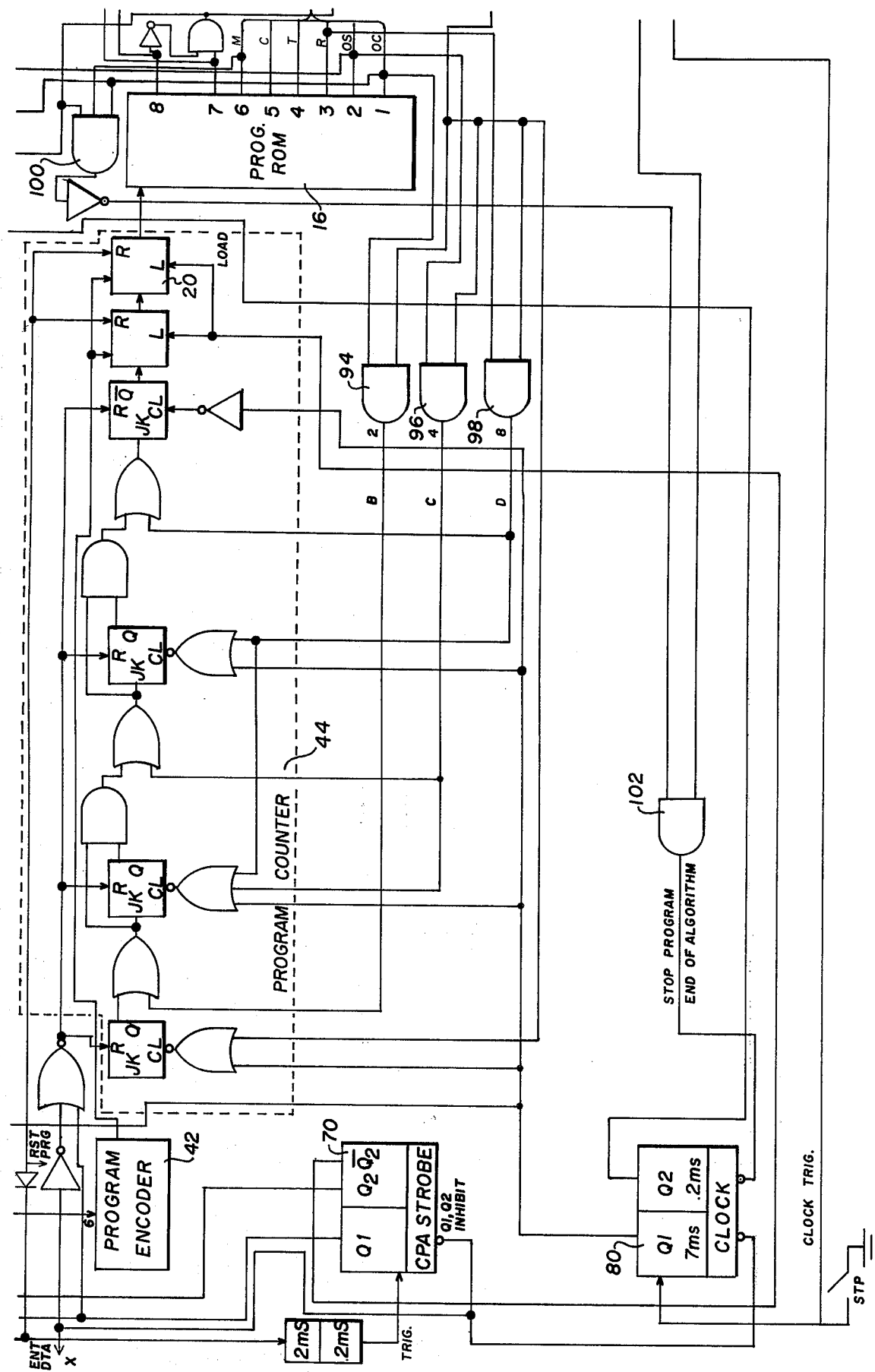

Referring now the schematic diagram of FIGS. 2A, B and C for a more detailed description the programmer for the calculator contains two main units; a data memory RAM (Random Access Memory) 14 into which data is inserted manually, and a program address ROM (Read Only Memory) 16 into which is permanently stored the addresses of a group of instructions which control the PCPU 18 and also fetches data from random access memory 14. One or more Signetics 25 LO1B's may be used for the RAM 14, while one or more Intel 1702's may be used for the ROM 16. The read only memory 16 contains a specific set of instructions for computing all five closest point of approach functions. During the CPA data insertion the selected TGT and the ENT DTA keys are depressed. This performs the following function: commands MUX 48 to accept data from the numeric keyboard 12 through the numeric keyboard encoder 34; enables gate 22; enables gate 24; and enables gate 26. With CPA key up, MUX 20 accepts data from CPA keyboard 10. CPA MUX 20 may be a Signetics 9322 while MUX 48 may be a Signetics 8264.

Depressing own course key of the CPA keyboard 10 enables a line to multiplexer 20 which is outputted to data address encoder 28. Data address encoder 28 generates a binary output which is the address selected for the insertion of the subsequent numeric data. The output of data address encoder 28 is fed by means of 8 parallel lines to data address counter 30 which is set to the particular count selected by data address encoder 28, by the load pulse from strobe circuit 32. Data address encoder 28 may be one or more Signetics 8223 while data address counter 30 may be one or more Signetics 8293. The output of data address counter 30 is fed to RAM 14, this being the address of the first digit of OWN COURSE data.

Depressing one NUMBER key on numeric keyboard 12 enables one of the nine lines coupling numeric keyboard 12 to numeric keyboard encoder 34. Numeric keyboard encoder 34 generates a four bit code and a strobe pulse. The four bit code is coupled directly as an input to data memory 14. The strobe trigger signal passes through gate 36 and triggers one shot strobe 38. After a 1.2 microsecond delay, one shot strobe 38 generates a 0.5 microsecond pulse which is fed to and causes the output of gate 40 to go high. The output of gate 40 is inverted by means of inverting amplifier 42 and is fed to gate 24. The output of gate 24 is fed to the R/W terminal of computer memory 14 and when its output is high it causes data memory 14 to write in the data presented to it from keyboard encoder 34. The output of gate 40 is also fed to gate 26 whose output is coupled to data address counter 30 and causes the counter to increment by one count on the trailing edge of the pulse. Counter 30 now has a count which is greater by one than that selected by data address encoder 28 and provides an output to data memory 14 and causes it to switch to the next higher numbered address. Depressing a second button on the numeric keyboard 12 causes the code for that key to be written in the next higher address in the data memory 14 than the first number. Simultaneously data address counter 30 is incremented by another count. This continues until a maximum of three digits have been entered into the group of address cells reserved specifically for OWN COURSE.

Depressing the OWN SPEED key on CPA keyboard 10 causes an enabling pulse to be fed from keyboard 10 to MUX 20 and data address encoder 28. Data address encoder 28 generates a code for the address of the OWN SPEED word. This causes data address counter 30 to be set to the same binary number, which selects the particular address in the data memory RAM 14 as described previously. The strobe pulse from Q strobe terminal of multivibrator 39 clears display 15 and disables gate 40 preventing the pulse from strobe 38 from passing through gate 24 and writing a "clear" command into data memory 14 at the address one count beyond OWN COURSE. To write in the first digit of the OWN SPEED word, one of the buttons on numeric keyboard 12 is depressed. This causes a number to be written into the selected address for that word and increments the address counter 30 by one count as described above. Subsequent depressions of the number keys (the maximum of 2) causes the value of the OWN SPEED to be written into the selected address for that function. There are only two digits for OWN SPEED.

The next bit of information to be entered into memory 14 is data-range, bearing, and time relative to target vessels. In order to enter target data, three keys must be depressed; one of the target keys either range, bearing, or time, and First Mark MK 1 or Second Mark MK 2. This combination of keys determine the address for the particular data to be entered. For example, depressing target B, range, MK 2 selects the address of the data for the range of target B for the second sighting.

The operation for entering target data is as follows: by depressing keys target A, First Mark, and range on CPA keyboard 10 in that order enables two of the lines to multiplexer 20 which is passed through to data address encoder 28. Data address encoder 28 generates an address code for storing the first digit of range for target A at the first sighting. There is an eight microsecond delay to allow other keys in that row to break before R (range) key makes contact. The subsequent operations are the same as entering the data for OWN COURSE and OWN SPEED described above. The only difference is that there are a maximum of five digits for range (in yards).

To read in the bearing data, the bearing key, B, on CPA keyboard 10 is depressed, releasing all other keys on that row that were depressed i.e., R. The three output energized lines resulting from this group of keys selects the address for the first digit of target A's bearing at the first sighting. Subsequent operation is the same as previously described. There are a maximum of three digits for bearing (in degrees) to the nearest degree.

To write in time, the time key, T, is depressed releasing all other keys on that row. This group selects the address for the time in hours and minutes. At time 17:58 for example, the number 17.58 would be entered. The first two numbers are the actual time in hours and the last two are the time in minutes. Subsequent operation is the same as previously described. There are four digits in time, i.e., to the nearest minute.

To enter the Second Mark, the Mark 2 key is depressed releasing all other keys on that row. This sets up the entry of target data for the second sighting of range, bearing, and time for any of the five selected targets. To enter data on target B, target B key is depressed releasing all other keys on that row. For example, depressing target B, range, and First Mark selects a unique address for insertion of the range of target B at the first sighting, which is different from that for target A. If during data entry a wrong key is depressed, or if it is desired to change any data entry, this can be readily accomplished by releasing the parameter key (i.e., range), then depressing it again. This sets up the starting address for range, and new data is written over the old.

After all data has been inserted the programmed computation of the required parameters is next performed. Because of the limited storage capacity of the PCPU 18 the computation of the functions for each target must be performed in a given sequence, namely range, time, bearing, target speed and target course, in that order. This is in agreement with the layout with these functions on the keyboard 10. For example, in order to determine the closest point of approach parameters for target A, the following sequence of events occur. The program counter 44 is reset to 0 by depressing and releasing RST PRG key on keyboard 10.

Depressing target A key then range key in that order initiates signals that are fed to program encoder 42 to generate the starting address of the range algorithm, which is the start of the program. The output of encoder 42 is fed to the last five bits of program counters 44. The CPA key is up and prevents the CPA multiplex 20 from accepting data from the read only memory 16. Depressing the range key on keyboard 10 generates a keyboard strobe which passes through gate 46, triggering strobe generator 32 which, in turn, generates a low pulse to counter 30, setting it to the starting address of Ro (range of selected target at the first mark) for TGT-A. Program multiplexer 48 will not accept the data since it is set to receive data only from memory 16. To initiate the program for determination of range of closest point of approach, CPA key on CPA keyboard 10 is depressed. Depression of this key releases all other keys in that row and initiates the following actions: Allows CPA multiplexer 20 to accept data address information from the read only memory 16. Triggers CPA strobe 70 which generates a first output Q1, a 0.2 ms pulse, and a second output Q2, a 1.3 ms pulse. The 0.2 ms pulse from CPA strobe 70 passes through gate 36 and triggers strobe 38, which generates a 0.5 ms pulse (Q2) 1.25 ms after Q1. This pulse is applied to gate 72 where it is ANDED with Q2 of CPA strobe 70 resulting in a 0.3 ms pulse starting at 1.2 ms. This pulse passes through gate 74 to the TTL-MOS voltage level shifter 76 and thence to the strobe input terminal of PCPU 18. TTL-MOS voltage shifter 76 may be of the Fairchild 9624 type. Prior to the arrival of the strobe pulse at PCPU 18 the program counter 44 generates the starting address for the range algorithm (all o's) and the read only memory 16 generates the first instruction. This instruction passes through data program multiplexer 48 level shifters 76 to the INST/DATA input terminal of PCPU 18 where it awaits the strobe pulse. The strobe pulse inputs the data from data/program multiplexer 48 to PCPU 18, which then operates on the instruction. During this time PCPU 18 generates a busy signal, which is fed through MOS-TTL voltage level shifter 78 and to clock 80. MOS-TTL voltage level shifter 78 may be of the Fairchild 9625 type. After the instruction has been completed, the busy signal is terminated (goes back to 0) which then triggers clock 80.

Clock 80 generates two outputs; Q1 which is 7 ms wide, followed by Q2 which is 0.2 ms wide. Q1 is applied to the program counter 44 which is incremented by one count which, in turn, causes the read only memory 16 to generate the second instruction to PCPU 18. The Q1 output pulse from clock 80 is also applied to gate 82 but is blocked by read only memory 16 since it has not called for a "fetch".

After termination of Q1 (7 ms) Q2 goes high. Q2 is passed through gate 74, voltage level shifters 76 and thence to the strobe input of PCPU 18. The following instructions are handled in a similar manner. It should be noted that during an instruction word, the code for that instruction is fed to CPA multiplexer 20 which accepts it and passes it through to encoder 28, which, in turn, generates some meaningless code that is fed to data memory 14. However, multiplexer 48 will not accept this input since it has been commanded to accept data from read only memory 16.

If, in a succeeding instruction step, the instruction calls for fetching data from the data memory 14, for example, the starting address of Ro for target A at Mark 1, read only memory 16 output line 7 goes high, and line 8 goes low, causing gate 88 to go high. This allows multiplexer 48 to accept data from data memory 14.

Since the address of any data word in data memory 14 is determined by which keys were activated at the time the data was inserted, the data is accessed in the program mode by recreating the same inputs to the data address encoder 28. Some of these bits are already supplied by the keyboard 10 during the program mode. For example, when the line from the target A key is energized, the missing lines that need to be supplied by the read only memory 16 is range and First Mark. Since these inputs determine the starting address for inserting Ro for target A, for this step, the read only memory 16 supplies the signals to CPA multiplexer 20 which then provides the correct input to data address encoder 28 for accessing Ro.

The outputs of strobe 70 also go to gates 82, 36, and 46 through an inverter. Since the Q1 output of CPA strobe 70 is low at this time, the output of gate 46 goes high, triggering through gate 90 the load strobe 32 which loads the starting address of Ro into data address counter 30. The data memory 14 thus accesses the first digit of Ro at MK 1 which is readout through data program multiplexer 48 to PCPU unit 18. The output of gate 88 is ANDED in gate 82 with the 7 ms pulse Q1 of CPA strobe 70 which triggers the strobe 38 whose 0.5 ms pulse output is applied to one input of gate 40. The output of gate 90 however triggers strobe 39 which generates a 2 ms pulse whose inverted output is applied as the second input of gate 40, thereby blocking the strobe pulse from strobe 38. The data address counter 30 is therefore not incremented during the first fetch instruction. After 7 ms, clock 80 generates a strobe pulse which reads the data into PCPU 18.

The outputs of the read only memory 16 do not change in recalling the remaining digits of any word stored in the data memory 14. The output of gate 88 remains high so that strobe 32 is not triggered. However, the 7 ms pulse from clock 80 is gated through gates 82 and 36, thus generating a 0.5 ms strobe pulse out of strobe 38 delayed by 1.2 ms. Since strobe 39 has not been triggered, gate 40 is enabled, which passes the strobe pulse through gate 26 and increments data address counter 30 on the trailing edge of the pulse.

This new address causes the second digit of Ro to be read out of data memory 14 which is then passed on to PCPU 18.

At the completion of the 7 ms clock pulse, clock 80 generates a 0.2 ms pulse which is gated through gate 74 to the strobe input of PCPU 18 through the level shifters 76, thus strobing in the data, after which the busy signal initiates the next instruction by triggering clock 80.

This process is continued until all digits of Ro have been read out. For each data word address, read only memory 16 generates a new word to CPA multiplexer 20 only at the start of an address; therefore, a load pulse is generated only for this starting address. Subsequent cells are accessed simply by incrementing data address counter 30.

Jump instructions may be required to calculate CPA data. In order to execute a jump instruction, read only memory 16 output line 8 goes high and line 7 goes low. This causes the output of gate 92 to go high, which enables gates 94, 96, and 98. If simultaneously, line 1 on the ROM 16 goes high, counter 44 will jump by 2 at the next clock pulse. If line 2 goes high the counter will jump by 4, and if line 3 goes high the counter will jump by 8. Upon completion of the last instructions for the range algorithm, read only memory 16 generates a stop instruction. This is accomplished by lines 1, 6, and 7 of memory 16 going high, and line 8 going low. This causes the output of gate 100 to go high and the inverted output to go low. The output of gate 102 then goes low which disables clock 80 and prevents counter 44 from incrementing to the next count.

Time determination is accomplished by releasing CPA key, depressing Time key and then depressing the CPA key. This action resets program counter 44 to the starting address of the time algorithm. This removes the inhibit signal from clock 80 and the program for time determination is initiated. The actions are the same as for range determination.

The operation for determination of bearing is the same as above. In the determination of target course and target speed, the OWN SHIPS COURSE and OWN SHIPS SPEED data needs to be accessed. During the insertion of this data, these are the only two keys which are depressed. During readout, however, when the closest point of approach calculations are being made, one of the target keys is depressed. If this condition were allowed to exist at the time when the programmer tried to fetch either OWN SHIP or OWN COURSE data, it would go to the wrong register. Therefore in order to inhibit the target key input line, the programmer 16 addresses the data memory RAM 14 through the CPA MUX 20, the data address encoder 28, and the data address counter 30, by line 1 "OWN COURSE" and line 2 "OWN SPEED" on the program ROM 16. There, the proper address is accessed. Otherwise the operation is the same as for the other parameters.

Obviously many modifications and variations of the present invention are possible in the light of the above teachings. It is therefore to be understood that within the scope of the appended claims the invention may be practiced otherwise than as specifically described.

What is claimed is:

1. Apparatus for computing closest point of approach parameters from target and own ship data taken at different times, said apparatus comprising:

a keyboard for generating signals represent a parameter to be calculated and for generating input data signals and including a re-set terminal;

data encoder circuit means having an input coupled to said keyboard for encoding the data signals generated by said keyboard and having an output;

data storage means having a first input coupled to the output of said data encoder for storing data and having second and third inputs and an output;

data address encoder means having an input coupled to said keyboard for encoding data address information and having an output;

data address counter means having a first input coupled to the output of said data address encoder, a second input coupled to the output of said keyboard, a third input and an output coupled to the third input of said data storage means;

program encoder circuit means having a first input coupled to the output of said keyboard for encoding program information and having an output;

program counter circuit means having a first input coupled to the output of said program encoder for providing an output signal in response to the particular parameter signal generated by said keyboard and having an output, second, and third, and fourth inputs;

program read-only memory circuit means having an input coupled to the output of said program counter and providing a control and address output, an increment counter output coupled to the second input of said data address counter, a control output, an instruction output and a jump output connected to the second input of said program counter;

a central processing unit coupled to said control and instruction outputs of said program read-only memory and to the output of said data storage means for computing a selected parameter in response to the control and instruction signals from said program read-only circuit means and providing termination signal at a first output of the computation and having a second output coupled to a display for displaying the computed results;

clock means having a first input connected to said keyboard and being responsive to a start output signal for providing output clock signals to a third input to said program counter for starting a computation and for discontinuing said clock pulses in response to the termination pulse from said control processing unit.

2. The calculator of claim 1 further comprising jump circuit means having inputs coupled to the jump outputs of said read-only memory and said central processing unit and having an output connected to said program counter for providing a jump signal to said fourth input of program counter in response to read-only memory program signals and central processing unit target data.

3. The calculator of claim 2 wherein each stage of said program counter is a JK flip-flop circuit, the first two stages of said counter being connected to said keyboard and being preset for each designatd program in response to a signal generated by depressing the appropriate keys on said keyboard.

4. The calculator of claim 3 wherein said program counter is incremented by an output pulse from said central processing unit unless a jump disabling signal disables the clock input to the appropriate stage of the program counter.

5. The calculator of claim 4 wherein said program counter comprises:

a plurality of flip-flop circuits, two of said flip-flop circuits being connected to form the first two stages of said counter, the re-set terminals of said first two stages being connected in parallel to the re-set terminal of said keyboard;

the remainder of said flip-flop circuits forming the remaining stages of said counter and being connected in parallel to the enter data switch on said keyboard.

* * * * *

UNITED STATES PATENT OFFICE
CERTIFICATE OF CORRECTION

PATENT NO. : 3,939,334
DATED : 2/17/76
INVENTOR(S) : Albert Roth and Gary M. Holma It is certified that error appears in the above-identified patent and that said Letters Patent are hereby corrected as shown below:

Column 3, lines 22 to 23, the equation should appear as follows:

$$\text{Time } (T_{CPA}) = \frac{R_o(T_o - T_1)(1 - \sin^2\beta)^{\frac{1}{2}}}{[R_o^2 + R_1^2 - 2 R_o R_1 \cos(\theta_o + \theta_1)]^{\frac{1}{2}}} + T_o$$

Column 3, lines 37 to 38, the equation should appear as follows:

$$\text{Target Velocity } (V_T) = [(\dot{S})^2 + (\dot{R}_2)^2 - 2 \dot{S} \dot{R}_2 \cos(\theta_o + \delta + \beta)]^{\frac{1}{2}}$$

Column 3, line 39, the equation should read:

$$\dot{R}_2 = \frac{[R_o^2 + R_1^2 - 2 R_o R_1 \cos(\theta_o - \theta_1)]^{\frac{1}{2}}}{(t_1 - t_o)}$$

Column 3, line 41, "S" should read -- $\dot{S}$ --;
Column 3, line 45, the equation should read:

$$\text{Target Course } (\phi) = \sin^{-1} \frac{V_{TEW}}{V_T}$$

Signed and Sealed this

Thirteenth Day of July 1976

[SEAL]

Attest:

RUTH C. MASON
Attesting Officer

C. MARSHALL DANN
Commissioner of Patents and Trademarks